US007253360B2

(12) United States Patent
Chen et al.

(10) Patent No.: US 7,253,360 B2
(45) Date of Patent: Aug. 7, 2007

(54) COMPUTER ENCLOSURE WITH DIRECT-MOUNTING FRONT BEZEL

(75) Inventors: Yun-Lung Chen, Tu-Cheng (TW); Da-Long Sun, Shenzhen (CN)

(73) Assignees: Hong Fu Jin Precision Industry (Shenzhen) Co., Ltd., Bao-an District, Shenzhen, Guangdong Province (CN); Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 0 days.

(21) Appl. No.: 11/288,897

(22) Filed: Nov. 29, 2005

(65) Prior Publication Data

US 2006/0278420 A1 Dec. 14, 2006

(30) Foreign Application Priority Data

Jun. 10, 2005 (CN) ............ 2005 2 0059966

(51) Int. Cl.
*H02G 3/08* (2006.01)

(52) U.S. Cl. ............... 174/50; 174/17 R; 174/520; 361/683; 361/796; 312/223.2

(58) Field of Classification Search ............ 174/50, 174/521, 520, 53, 57, 58, 17 R; 361/683, 361/724, 730, 752, 796; 312/223.1, 223.2, 312/223.3; 220/3.2, 3.8, 4.02; D14/441, D14/450, 445, 444

See application file for complete search history.

(56) References Cited

U.S. PATENT DOCUMENTS

| | | | | |
|---|---|---|---|---|
| 5,067,041 A | * | 11/1991 | Cooke et al. ............ | 361/730 |
| 5,169,218 A | * | 12/1992 | Chu ....................... | 312/223.2 |
| D392,281 S | * | 3/1998 | Poole et al. ............. | D14/441 |
| D393,259 S | * | 4/1998 | Poole et al. ............. | D14/441 |
| 5,777,854 A | * | 7/1998 | Welch et al. ............ | 361/752 |
| 6,288,333 B1 | * | 9/2001 | Liu et al. ................ | 312/223.2 |
| 6,288,336 B1 | * | 9/2001 | Chen ...................... | 174/50 |
| 6,296,333 B1 | * | 10/2001 | Lee et al. ............... | 312/223.2 |
| 6,307,756 B1 | * | 10/2001 | Liu et al. ................ | 361/683 |
| 6,373,690 B1 | * | 4/2002 | Buican et al. ........... | 361/683 |
| 6,469,904 B1 | * | 10/2002 | Vigeant et al. .......... | 361/752 |
| 6,555,747 B2 | | 4/2003 | Chen et al. | |
| 6,637,847 B2 | * | 10/2003 | Crisp et al. ............. | 312/223.2 |
| 6,738,255 B2 | * | 5/2004 | Chen ...................... | 361/683 |
| D491,571 S | * | 6/2004 | Chen et al. ............. | D14/445 |
| 7,009,845 B2 | * | 3/2006 | Chen et al. ............. | 361/726 |
| D533,557 S | * | 12/2006 | Chen et al. ............. | D14/444 |

* cited by examiner

*Primary Examiner*—Angel R. Estrada
(74) *Attorney, Agent, or Firm*—Morris Manning & Martin; Tim Tingkang Xia, Esq.

(57) ABSTRACT

A computer enclosure includes a cage (10) and a front bezel (20). The cage includes a top panel (18), a bottom panel (17), and a pair of side panels (11). The top panel, the bottom panel, and the side panels are connected with each other to define an opening (15). The front bezel has securing structures (222) at opposite sides thereof for securing the front bezel to the cage. The front bezel is secured to the cage for covering the opening. The computer enclosure with direct-mounting front bezel has simple structures and is inexpensive.

16 Claims, 4 Drawing Sheets

COMPUTER ENCLOSURE WITH DIRECT-MOUNTING FRONT BEZEL

BACKGROUND OF THE INVENTION

1. Field of the Invention

The present invention relates to computer enclosures, more particularly to a computer enclosure with a removable front bezel.

2. General Background

A conventional computer enclosure includes a cage and a bezel. The cage includes a front plate defining a plurality of locking openings and locating holes, and a bottom plate defining a pair of locking apertures. The bezel has a plurality of engaging hooks engaging with the front plate in the corresponding locking openings, and locating posts received in the corresponding locating holes. The bezel also has a pair of arcuate supporting feet. Each supporting foot includes a horizontal surface abutting against a bottom surface of the bottom plate, and a catch abutting against a top surface of the bottom plate near the corresponding locking aperture. When the bezel is attached to the cage, the supporting feet are elastically deformed to cause the bezel to be firmly attached to the front plate of the cage.

However, the computer enclosure has an unduly complex structure, and the cost of manufacturing the computer enclosure is relatively high.

What is needed, therefore, is an inexpensive computer enclosure having a simple structure.

SUMMARY

A computer enclosure includes a cage and a front bezel. The cage includes a top panel, a bottom panel, and a pair of side panels perpendicular to the top panel. The top panel, the bottom panel, and the side panels are connected with each other to define an opening. The front bezel has securing structures at opposite sides thereof for securing the front bezel to the cage. The front bezel is secured to the cage for covering the opening.

Other advantages and novel features will be drawn from the following detailed description of a preferred embodiment with attached drawings, in which:

DETAILED DESCRIPTION OF PREFERRED EMBODIMENT

Figure 1:
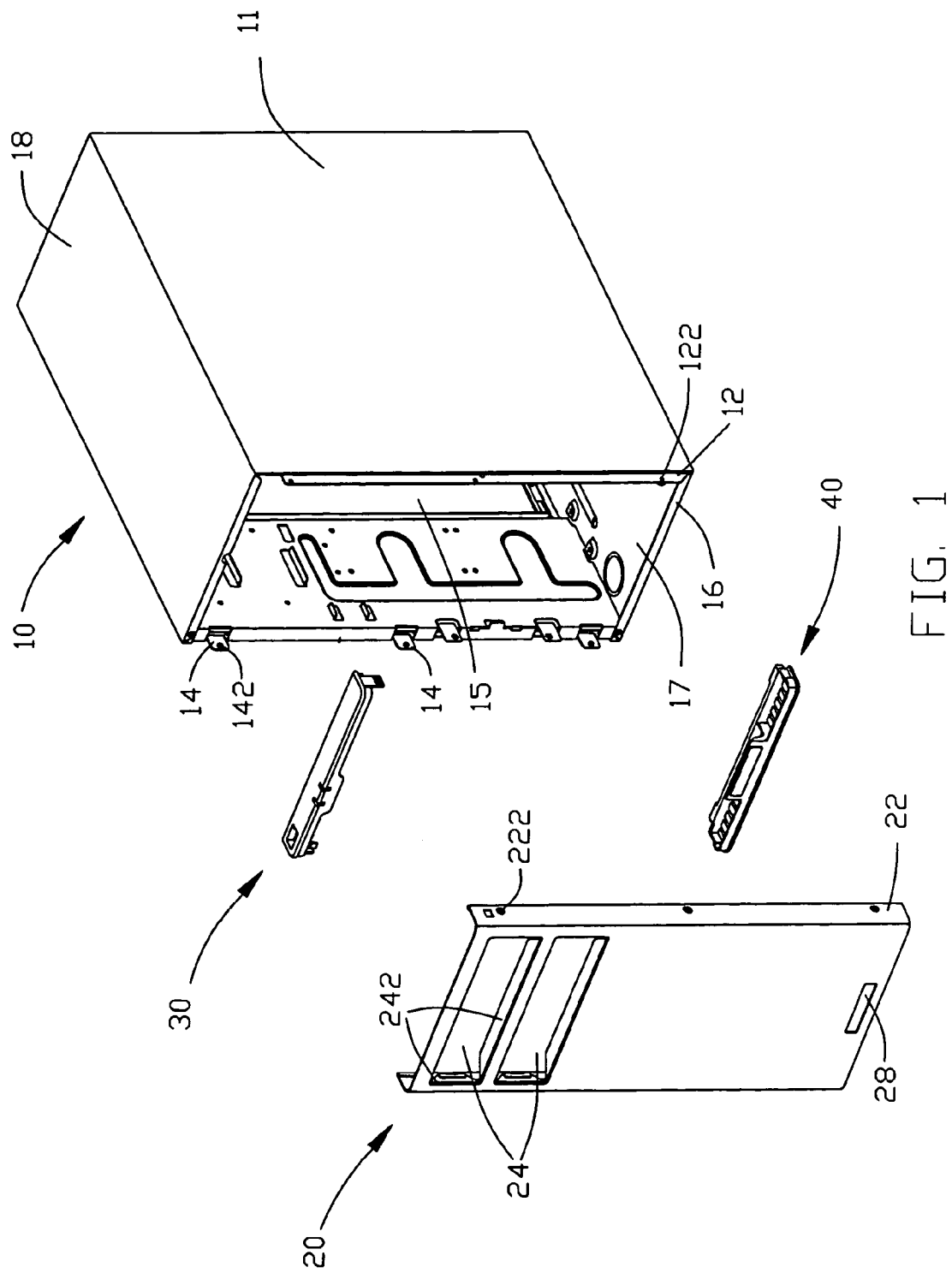
FIG. 1 is an exploded, isometric view of a computer enclosure of a preferred embodiment of the present invention, the computer enclosure including a cage, a front bezel, a top connecting member, and a bottom connecting member.

Referring to FIG. 1, an enclosure of an electronic device like a computer includes a cage 10, a front bezel 20 attached to the cage 10, a top connecting member 30, and a bottom connecting member 40.

The cage 10 made of material for providing Electromagnetic Interference (EMI) protection includes a bottom panel 17, a top panel 18, and two side panels 11 perpendicular to the top panel 18 and the bottom panel 17. The bottom panel 17, the top panel 18, and the side panels 11 are connected with each other to form an opening 15 at the front end of the cage 10. A side flange 12 is formed at an edge of one side panel 11. A plurality of mounting holes 122 is defined in the side flange 12. A plurality of connecting clips 14 is formed on the other side panel 11. A mounting hole 142 is defined in each connecting clip 14. A bottom flange 16 is upwardly formed at a front end of the bottom panel 17.

Figure 2:
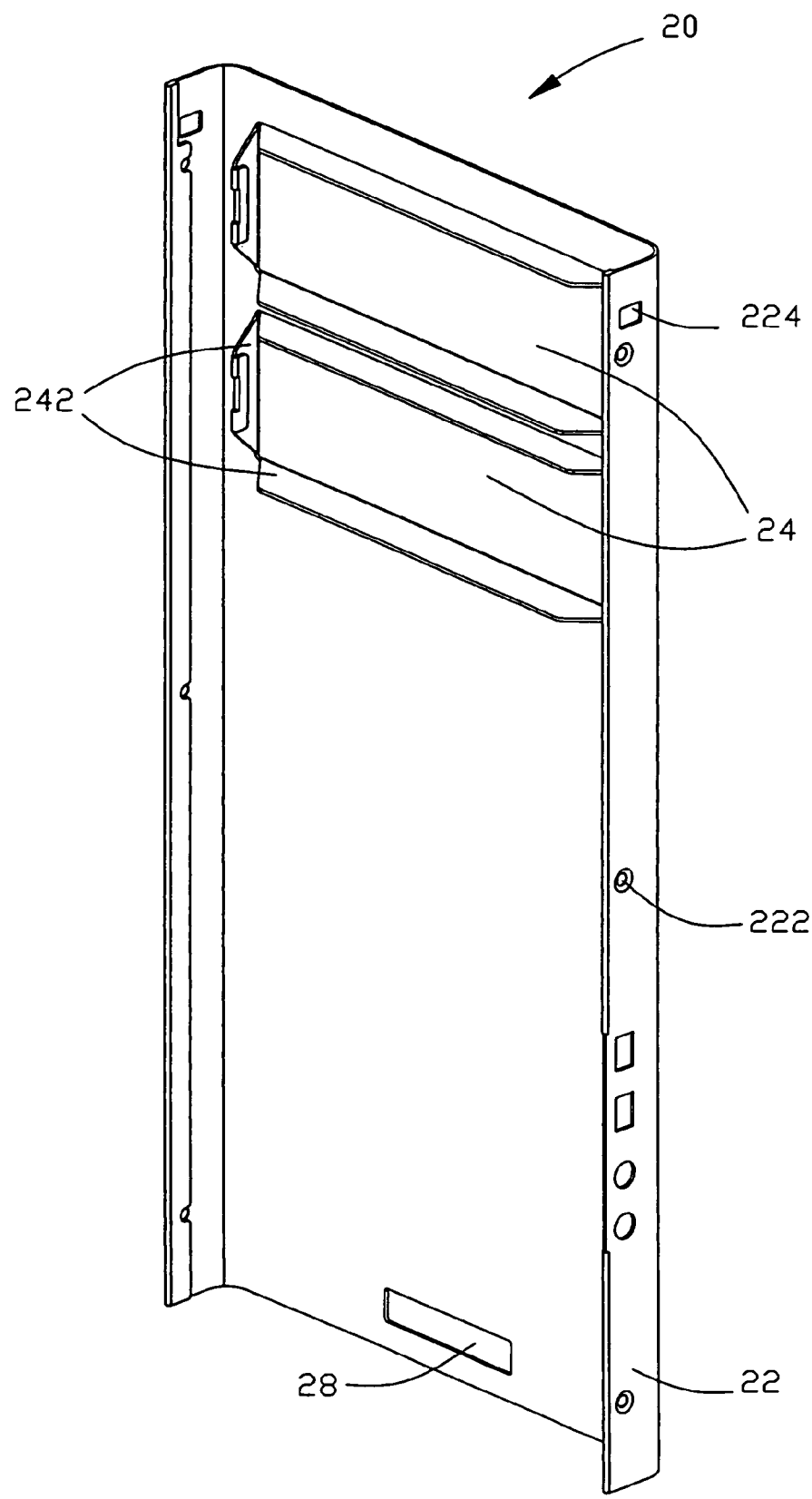
FIG. 2 is an enlarged, isometric view of the front bezel of FIG. 1, but viewed from another aspect.

Referring also to FIG. 2, the front bezel 20 is made of the same material as the cage and capable of providing EMI protection as well. A pair of side walls 22 are formed at opposite sides of the front bezel 20 respectively. Two rectangular openings 24 are defined in a top portion of the front bezel 20. The rectangular openings 24 are used to receive or provide access to one or more connectors and/or disk drives such as CD-ROM (Compact Disk Read Only Memory) disk drives, HDDs (Hard Disk Drives), or FDDs (Floppy Disk Drives) housed in the cage 10. A plurality of supporting clips 242 is bent inward from edges of the openings 24 to support the disk drives. A through opening 28 is defined in a bottom portion of the front bezel 20. A plurality of mounting holes 222 are defined in the side walls 22 of the front bezel 20, corresponding to the mounting holes 122, 142 of the side flanges 12 on the cage 10. A securing opening 224 is defined in a top portion of each side wall 22.

Figure 3:
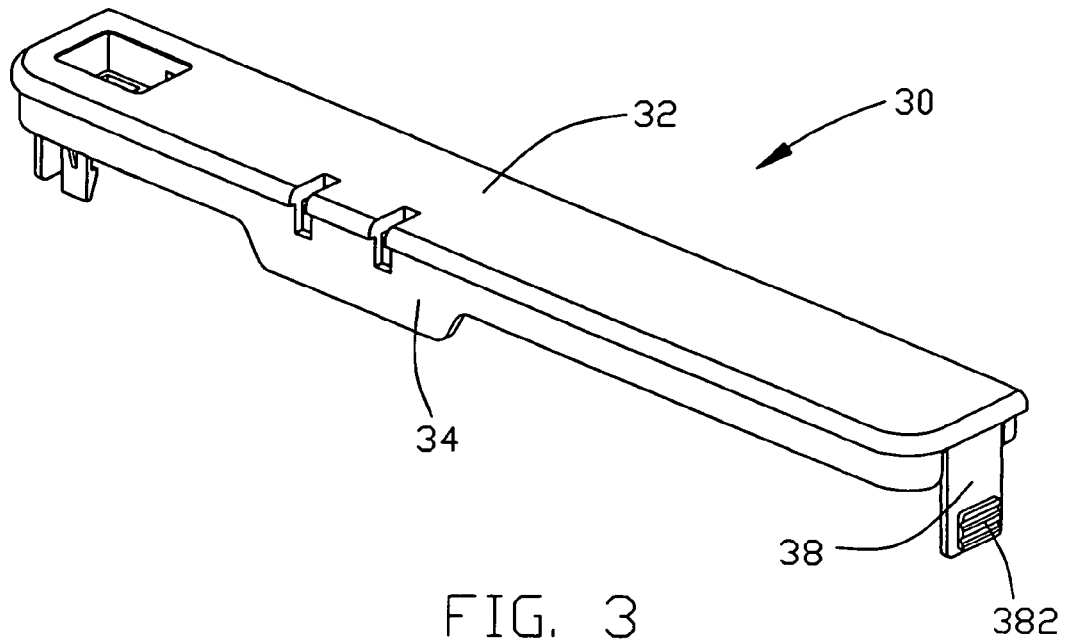
FIG. 3 is an enlarged, isometric view of the top connecting member of FIG. 1.

Referring also to FIG. 3, the top connecting member 30 includes a generally rectangular top wall 32, and a front wall 34 extending perpendicularly down from an edge portion of the top wall 32. A pair of resilient clips 38 extends perpendicularly down from opposite ends of the top wall 32 respectively. A ridged protrusion 382 is outwardly formed on each resilient clip 38, the protrusions 382 corresponding to the securing openings 224 of the front bezel 20.

Figure 4:
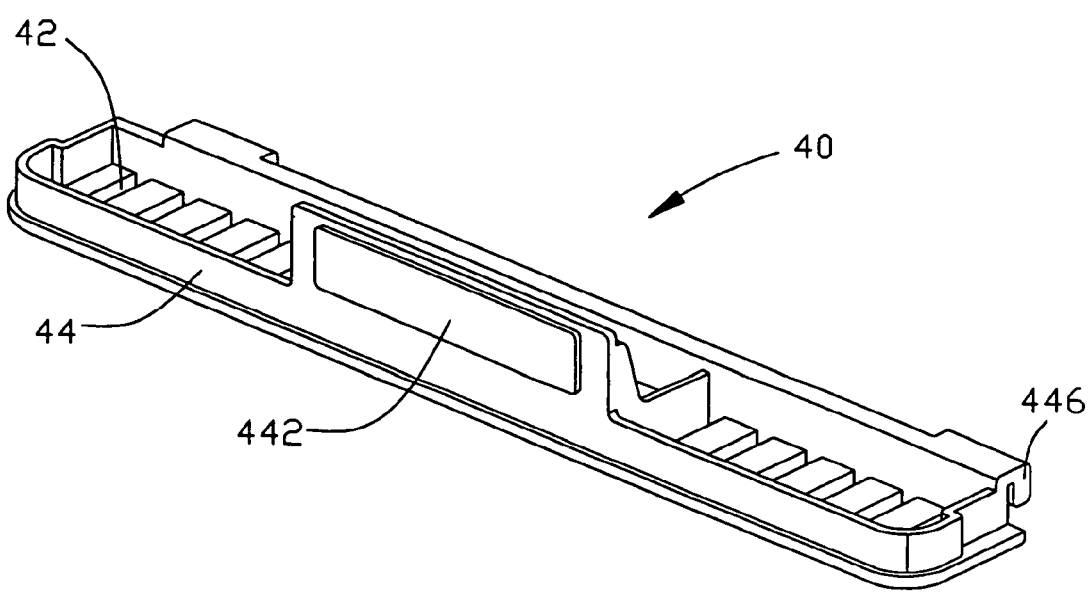
FIG. 4 is an enlarged, isometric view of the bottom connecting member of FIG. 1.

Referring also to FIG. 4, the bottom connecting member 40 includes a bottom wall 42, and a front wall 44 extending perpendicularly up from an edge portion of the bottom wall 42. A securing portion 442 protrudes from the front wall 44, corresponding to the opening 28 of the front bezel 20. Two hooks 446 are bent downwardly from the bottom connecting member 40, corresponding to the bottom flange 16 of the cage 10.

Figure 5:
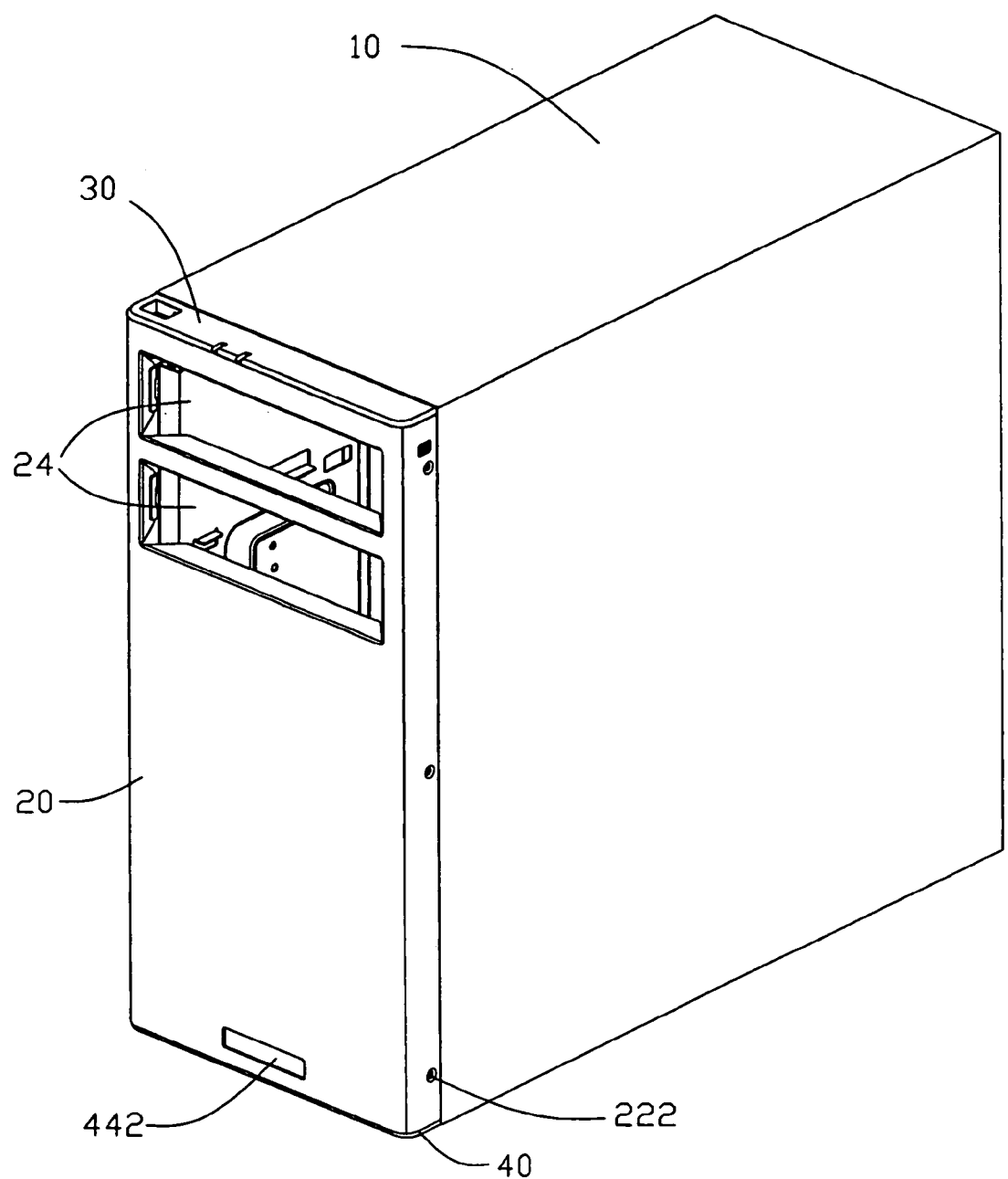
FIG. 5 is an assembled view of FIG. 1.

Referring also to FIG. 5, in assembly, the resilient clips 38 of the top connecting member 30 are pressed inward to secure the protrusions 382 into the corresponding securing openings 224 of the front bezel 20. The top connecting member 30 is thus secured to the front bezel 20. The securing portion 442 of the bottom connecting member 40 is received in the opening 28 of the front bezel 20. The bottom connecting member 40 is thus secured to the front bezel 20. The front bezel 20 is placed on the front end of the computer enclosure to cover the opening 15. The hooks 446 of the bottom connecting member 40 are hooked to the bottom flange 16 of the cage 10. The mounting holes 222 of the front bezel 20 align with the corresponding mounting holes 122, 142 of the cage 10. Thereupon the front bezel 20 is secured to the cage 10 with a plurality of fasteners such as screws, using the mounting holes 222 of the front bezel and the mounting holes 122, 142 of the cage 10.

Usually, a front bezel is mounted to a front panel formed in a cage to support a disk drive. However, in the preferred embodiment, the front bezel 20 is directly coupled to the cage 10 at the opening 15 instead. Thus the computer enclosure of the preferred embodiment is simple and inexpensive.

It is to be understood, however, that even though numerous characteristics and advantages have been set forth in the foregoing description of a preferred embodiment, together with details of the structure and function thereof, the disclosure is illustrative only, and changes may be made in detail, especially in matters of shape, size, and arrangement of parts within the principles of the invention to the full extent indicated by the broad general meaning of the terms in which the appended claims are expressed.

We claim:

1. A computer enclosure comprising:
   a cage comprising a top panel, a bottom panel, and a pair of side panels, the top panel, the bottom panel, and the side panels connecting with each other to define an opening, a connecting clip formed on a side panel of the cage; and
   a front bezel secured to the cage for covering the opening, the front bezel defining a rectangular opening for receiving at least one storage device, and a supporting clip extending from an edge of the opening of the front bezel for supporting the at least one storage device, the front bezel secured to the connecting clip.

2. The computer enclosure as described in claim 1, wherein at least one side flange is formed on a side panel of the cage, and the front bezel is secured to the at least one side flange.

3. The computer enclosure as described in claim 2, wherein the front bezel comprises a plate, at least one side wall is formed at an edge of the plate of the front bezel, corresponding to the at least one side flange of the cage.

4. The computer enclosure as described in claim 1, further comprising a top connecting member secured to a top of the front bezel.

5. The computer enclosure as described in claim 4, wherein a resilient clip with a protrusion is formed on the top connecting member, for securing the top connecting member to the front bezel.

6. The computer enclosure as described in claim 1, further comprising a bottom connecting member secured to a bottom end of the front bezel.

7. The computer enclosure as described in claim 6, wherein a bottom flange is upwardly formed from a front end of the bottom panel of the cage, and a hook is formed on the bottom connecting member for engaging with the bottom flange.

8. The computer enclosure as described in claim 6, wherein a securing portion is formed on the bottom connecting member, for engaging in a through opening defined in the front bezel.

9. The computer enclosure as described in claim 1, wherein the front bezel is made of material same as the cage so as to provide electrical features including Electromagnetic Interference (EMI) protection same as the cage.

10. A computer enclosure comprising:
    a cage comprising a top panel, a bottom panel, and a pair of side panels, the top panel, the bottom panel, and the side panels connecting with each other to form an opening;
    a front bezel covering the opening, the front bezel having securing structures at opposite sides thereof for securing the front bezel to the cage, a through opening defined in the front bezel; and
    a bottom connecting member secured to a bottom end of the front bezel, a securing portion formed on the bottom connecting member for engaging in the through opening.

11. The computer enclosure as described in claim 10, wherein a pair of side walls is formed on opposite sides of the front bezel to define the securing structures thereon, and a pair of side flanges is formed on the side panels of the cage for engaging with the securing structures of the side walls with fasteners.

12. The computer enclosure as described in claim 10, further comprising a top connecting member secured to a top of the front bezel.

13. The computer enclosure as described in claim 12, wherein a resilient clip with a protrusion is formed on the top connecting member, for securing the top connecting member to the front bezel.

14. The computer enclosure as described in claim 10, wherein a bottom flange is upwardly formed from a front end of the bottom panel of the cage, and a hook is formed on the bottom connecting member for engaging with the bottom flange.

15. An electronic device comprising:
    a cage of said electronic device defining a first space to accommodate components of said electronic device therein, said cage defining an outline beside said first space along a side thereof;
    a bezel of said electronic device removably attachable to said side of said cage to cover said side of said cage, said bezel defining a second space therein spatially located out of said outline and spatially communicable with said first space through said outline; and
    at least one connecting member removably attachable to one of said cage and said bezel, said at least one connecting member exclusively embracing said second space of said bezel together with said bezel, said at least one connecting member comprising a bottom connecting member securable to a bottom end of said bezel via a through hole defined in said bottom end of said bezel.

16. The electronic device as described in claim 15, wherein a pair of side walls is formed on opposite sides of said bezel so as to engage with a pair of side flanges formed on said cage.

* * * * *